United States Patent
Masuda et al.

(10) Patent No.: US 12,062,495 B2
(45) Date of Patent: Aug. 13, 2024

(54) ELECTRONIC DEVICE

(71) Applicant: TDK CORPORATION, Tokyo (JP)

(72) Inventors: Akihiro Masuda, Tokyo (JP); Takaaki Sato, Tokyo (JP); Norihisa Ando, Tokyo (JP); Shinya Ito, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/331,358

(22) Filed: Jun. 8, 2023

(65) Prior Publication Data

US 2023/0420188 A1 Dec. 28, 2023

(30) Foreign Application Priority Data

Jun. 22, 2022 (JP) ................. 2022-100543

(51) Int. Cl.
 *H01G 4/38* (2006.01)
 *H01G 4/224* (2006.01)
 *H01G 4/236* (2006.01)

(52) U.S. Cl.
 CPC ............. *H01G 4/224* (2013.01); *H01G 4/236* (2013.01); *H01G 4/38* (2013.01)

(58) Field of Classification Search
 CPC .................................. H01G 4/236; H01G 4/38
 See application file for complete search history.

(56) References Cited

U.S. PATENT DOCUMENTS

| | | | |
|---|---|---|---|
| 2020/0203076 A1* | 6/2020 | Ando | H01G 4/228 |
| 2020/0294719 A1* | 9/2020 | Masuda | H01G 4/224 |
| 2021/0043382 A1 | 2/2021 | Masuda et al. | |
| 2021/0225589 A1* | 7/2021 | Masuda | H01G 4/228 |
| 2021/0375547 A1* | 12/2021 | Saito | H01G 4/232 |
| 2021/0375553 A1* | 12/2021 | Masuda | H01F 27/2823 |
| 2022/0157673 A1* | 5/2022 | Kimijima | H01L 23/24 |
| 2023/0010668 A1* | 1/2023 | Masuda | H01G 4/224 |
| 2023/0268127 A1* | 8/2023 | Sato | H01G 2/106 |
| | | | 361/306.1 |
| 2023/0386747 A1* | 11/2023 | Sato | H01G 4/232 |

FOREIGN PATENT DOCUMENTS

JP 2021-027286 A 2/2021

\* cited by examiner

*Primary Examiner* — Hung V Ngo
(74) *Attorney, Agent, or Firm* — Oliff PLC

(57) ABSTRACT

An electronic device includes a chip component including a terminal electrode, a case having an accommodation recess accommodating the chip component, a conductive terminal attached to the case and connected to the terminal electrode, and a case cover disposed on an opening-edge surface of the case so as to cover the accommodation recess. The opening-edge surface has an opening-edge recess at least partly covered by the case cover. The opening-edge recess and the case cover have a space therebetween. The space is filled with a resin.

12 Claims, 12 Drawing Sheets

ELECTRONIC DEVICE

TECHNICAL FIELD

The present disclosure relates to an electronic device including a case capable of accommodating a chip component.

BACKGROUND

An electronic device including a case capable of accommodating a chip component is known as disclosed in, for example, Patent Document 1. In the electronic device described in Patent Document 1, a metal terminal is attached to the case, and the metal terminal is connected to a terminal electrode of the chip component.

Unfortunately, research by the present inventors has revealed that contact between the metal terminal and the terminal electrode may become insufficient when the electronic device is reflow-soldered.

Patent Document 1: JP2021027286 (A)

SUMMARY

The present disclosure has been achieved under such circumstances. It is an object of the disclosure to provide an electronic device in which contact failure can be prevented.

Through research and study, the present inventors have newly discovered the following facts. For example, in order to ensure moisture resistance or impact resistance of a chip component, the inside of a case is filled with a potting resin. However, when an electronic device is reflow-soldered, a contact point between a metal terminal and a terminal electrode may be misaligned due to, for example, expansion of the potting resin, possibly resulting in contact failure between the metal terminal and the terminal electrode. Through diligent consideration, the present inventors have found a technique for preventing the occurrence of such a defect.

To achieve the above object, an electronic device of the present disclosure comprises:
- a chip component including a terminal electrode,
- a case having an accommodation recess accommodating the chip component,
- a conductive terminal attached to the case and connected to the terminal electrode, and
- a case cover disposed on an opening-edge surface of the case so as to cover the accommodation recess, wherein
- the opening-edge surface has an opening-edge recess at least partly covered by the case cover,
- the opening-edge recess and the case cover have a space therebetween, and
- the space is filled with a resin.

In the electronic device of the present disclosure, the space is provided between the opening-edge recess and the case cover and is filled with the resin. Thus, the case cover is connected to the opening-edge recess (opening-edge surface) via the resin in the space. The accommodation recess, which is located inwards from the opening-edge surface, is thereby sealed (airtightly shut) with the case cover. This improves moisture resistance of the inside of the accommodation recess. Thus, the moisture resistance of the inside of the accommodation recess can be improved without the accommodation recess accommodating the chip component being sealed with resin.

Also, because a need for the accommodation recess to be filled with the resin is eliminated, misalignment of a contact point between the conductive terminal and the terminal electrode attributable to expansion of the resin can be prevented, which allows for avoidance of contact failure between them.

The opening-edge recess may extend along a periphery of the accommodation recess so as to surround the accommodation recess. In this case, the case cover is connected to the opening-edge recess (opening-edge surface) via the resin along the periphery of the accommodation recess so as to surround the accommodation recess. Hermeticity of the accommodation recess is thereby improved, which can further improve the moisture resistance of the inside of the accommodation recess.

The opening-edge surface may comprise an inner opening-edge surface and an outer opening-edge surface located outwards from the inner opening-edge surface, and the case cover may be disposed on the inner opening-edge surface. Forming the case cover so that the case cover is disposed on the inner opening-edge surface allows the case cover and, by extension, the electronic device to be reduced in size.

A distance between the inner opening-edge surface and a bottom of the case may be shorter than a distance between the outer opening-edge surface and the bottom of the case. In this case, protrusion of the case cover from the level of the opening of the case can be prevented when the case cover is disposed on the inner opening-edge surface.

The conductive terminal may comprise an opening-edge electrode portion disposed over the opening-edge surface; and the opening-edge electrode portion may comprise an inner anchoring portion disposed between the inner opening-edge surface and the case cover, and an outer exposed portion disposed over the outer opening-edge surface and exposed outside. In this case, because the inner anchoring portion is interposed between the inner opening-edge surface and the case cover, the inner anchoring portion can be anchored to the inner opening-edge surface. Also, the conductive terminal can be connected to an external substrate via, for example, the outer exposed portion.

The case may comprise a wall surrounding the accommodation recess; the wall may comprise an outer wall portion located outwards from the opening-edge recess; and the case cover may be accommodated in a case cover accommodation portion surrounded by the outer wall portion. In this case, because the case cover is surrounded by the outer wall portion, misalignment or detachment of the case cover can be prevented.

The case cover may comprise a leg portion at a periphery of the case cover; and the leg portion may engage with the opening-edge recess. In this case, because the leg portion is anchored to the opening-edge recess, misalignment or detachment of the case cover can be prevented.

The space may be provided between the leg portion and a bottom of the opening-edge recess. In this case, the space between the leg portion and the bottom of the opening-edge recess can be filled with the resin. Thus, the leg portion and the opening-edge recess can be connected via the resin in the space. The inside of the accommodation recess can thereby be airtightly sealed with the case cover.

The conductive terminal may comprise the opening-edge electrode portion disposed over the opening-edge surface; the opening-edge electrode portion may comprise a bent portion bent towards the bottom of the opening-edge recess; and the bent portion may be disposed between the bottom of the opening-edge recess and the leg portion. In this case, the bent portion can be connected to the opening-edge recess via the resin in the space between the bottom of the opening-edge recess and the leg portion. Also, because the bent portion is interposed between the bottom of the opening-edge recess and the leg portion, the bent portion can be anchored to the opening-edge recess.

The case may comprise the wall surrounding the accommodation recess; and the wall may comprise the outer wall portion located outwards from the opening-edge recess, and an inner wall portion located inwards from the opening-edge recess. In this case, the opening-edge surface has the opening-edge recess so that the opening-edge recess is interposed between the outer wall portion and the inner wall portion. Thus, the space between the opening-edge recess and the case cover readily holds the resin.

The opening-edge surface may comprise the inner opening-edge surface and the outer opening-edge surface located outwards from the inner opening-edge surface; and the inner opening-edge surface may comprise an opening-edge sloping portion sloping down outwards. In this case, the opening-edge surface can have the opening-edge recess recessed along the opening-edge sloping portion. Thus, the resin can be prevented from leaking from the space between by the opening-edge recess and the case cover.

The case cover may comprise the leg portion at a periphery of the case cover, and the leg portion may comprise a cover sloping portion sloping along the opening-edge sloping portion. Disposing the cover sloping portion over the opening-edge sloping portion allows the opening-edge recess and the leg portion to firmly adhere to each other, which can improve adhesion between the opening-edge recess and the case cover.

BRIEF DESCRIPTION OF THE DRAWING(S)

DETAILED DESCRIPTION

Embodiments of the present disclosure are described with reference to the drawings. Although the embodiments are described with reference to the drawings as necessary, the illustrated contents are only schematically and exemplarily shown for understanding of the present disclosure, and the appearance, dimensional ratios, etc. may be different from the actual ones. Hereinafter, the present disclosure is specifically described based on the embodiments, but the present disclosure is not limited to these embodiments.

First Embodiment

Figure 1:
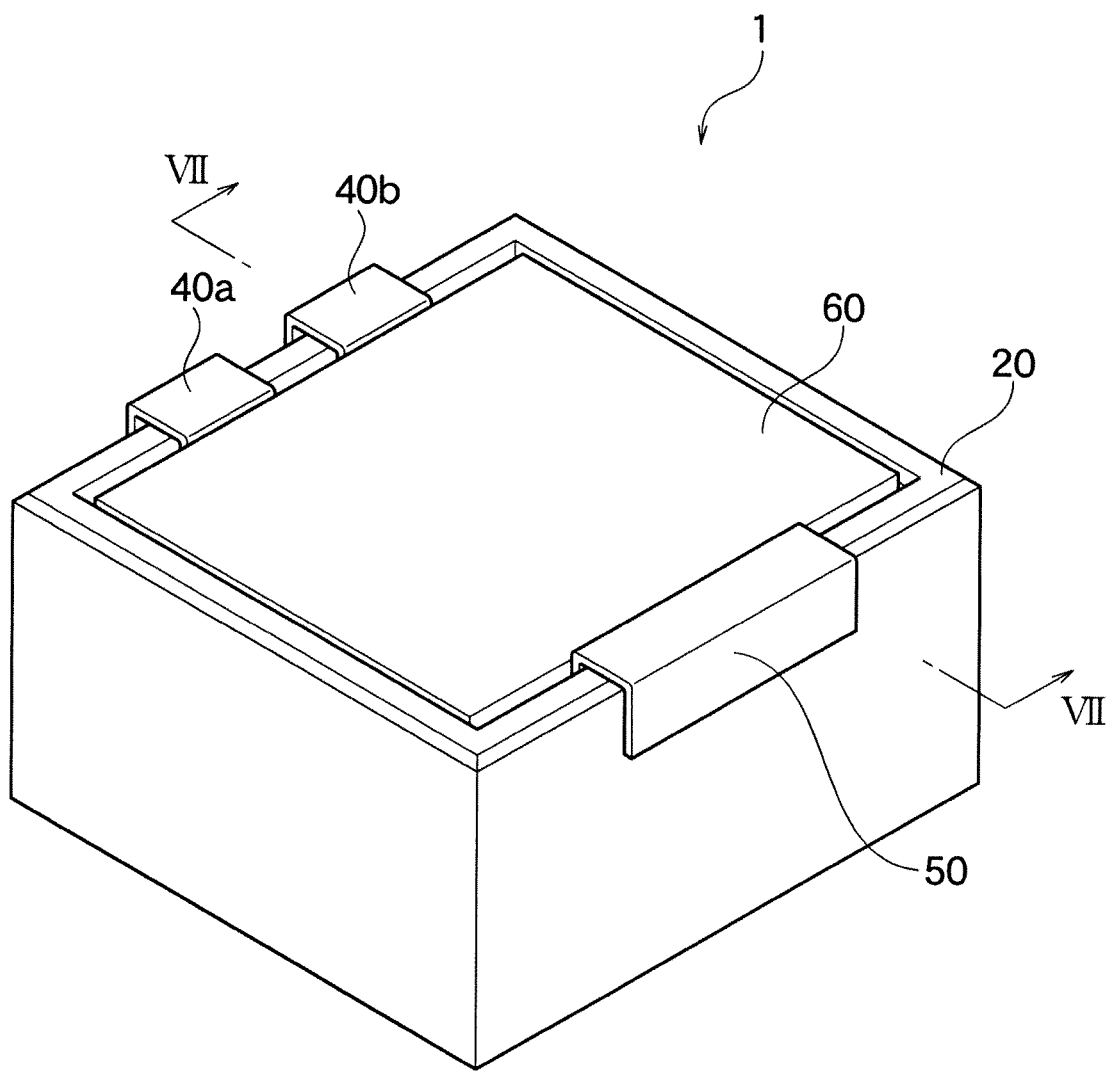
FIG. 1 is a perspective view of an electronic device of First Embodiment.
Figure 2:
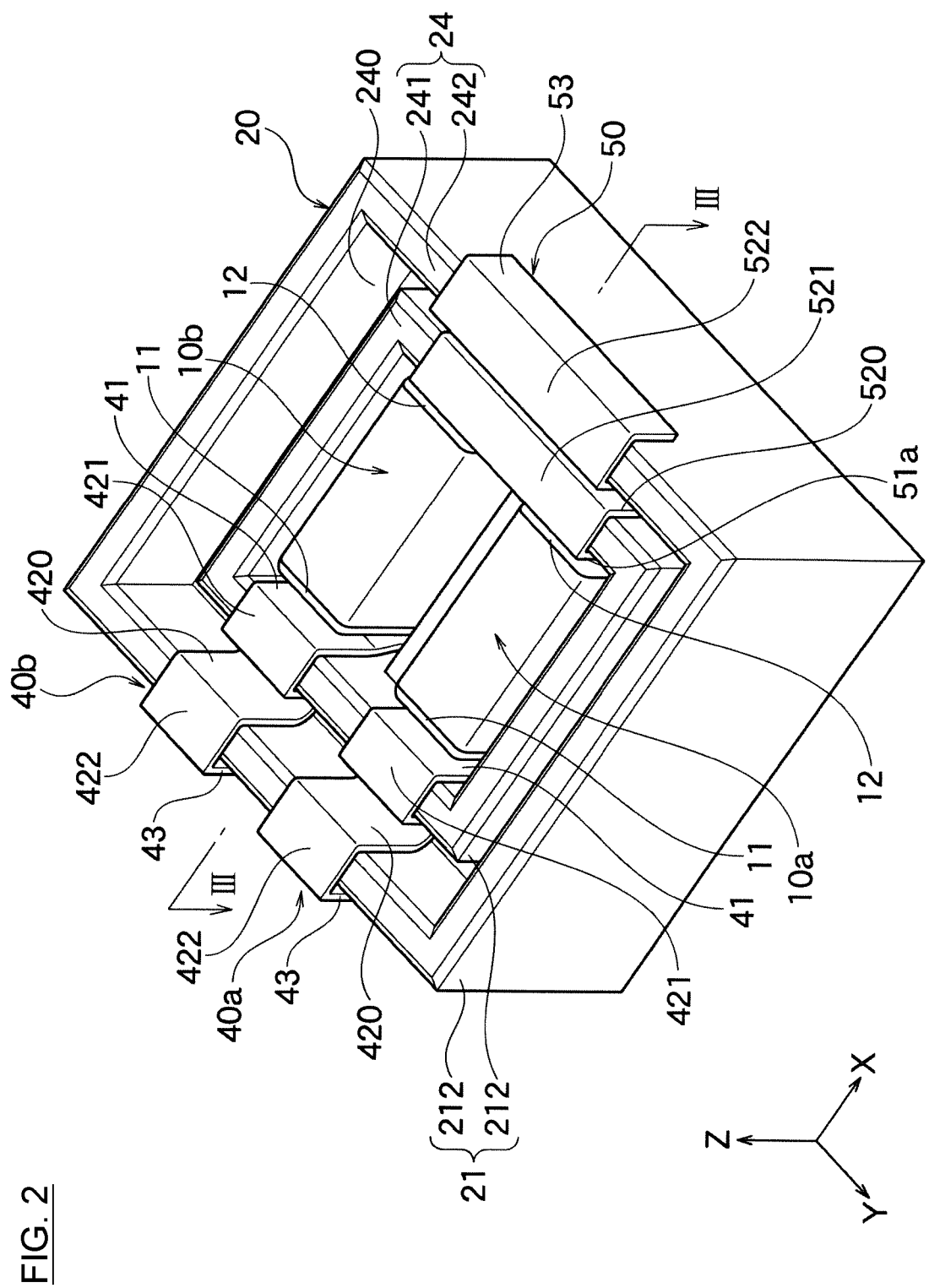
FIG. 2 is a perspective view illustrative of an internal structure of the electronic device shown in FIG. 1.

As shown in FIGS. 1 and 2, an electronic device 1 of the present embodiment includes capacitor chips 10a and 10b, a case 20, a resin 30 (FIG. 3), individual conductive terminals 40a and 40b, a common conductive terminal 50, and a case cover 60.

In the drawings, the XYZ coordinate system is a coordinate system relative to the case 20. On the basis that the case 20 is viewed in a plan view, an axis parallel to one of two orthogonal sides of the case 20 is the X-axis, and an axis parallel to the other side is the Y-axis. The Z-axis is an axis perpendicular to a bottom surface of the case 20. The origin of the XYZ coordinate system is determined at a center of the bottom surface of the case 20.

Hereinafter, the positive direction of the Z-axis is referred to as an upward direction, and the negative direction of the Z-axis is referred to as a downward direction; and a direction towards a center of the case 20 is referred to as an inward direction, and a direction away from the center of the case 20 is referred to as an outward direction, in respect of the X-axis and the Y-axis.

Figure 3:
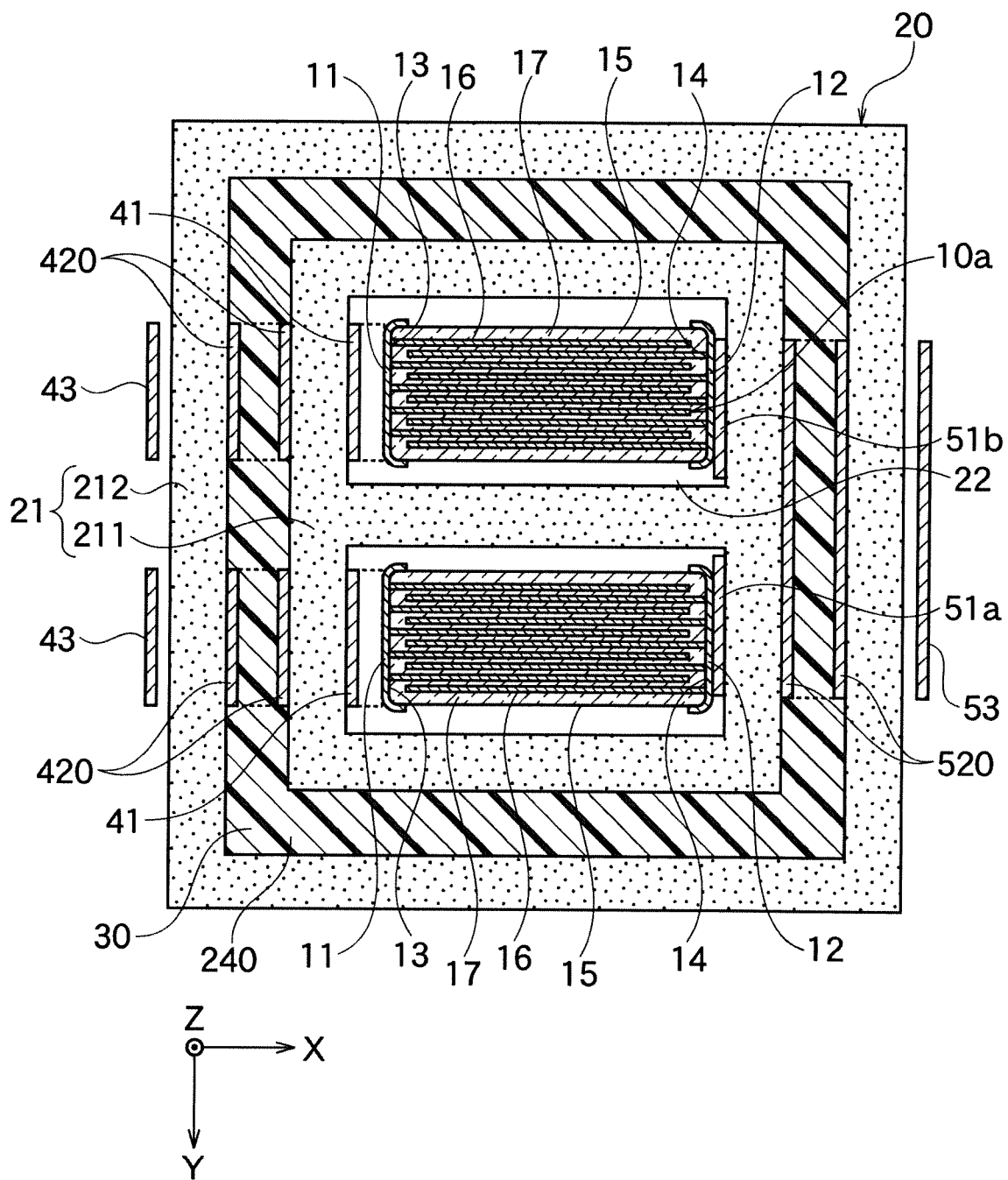
FIG. 3 is a sectional view of the electronic device shown in FIG. 2 along line III-III.

As shown in FIGS. 2 and 3, the capacitor chips 10a and 10b each have a substantially rectangular parallelepiped shape and have the same shape and the same size. In the present embodiment, "the same" not only indicates being exactly the same but also allows for a margin of error of within ±10%. Hereinafter, in order to avoid duplication of description, only the capacitor chip 10a is described with respect to a structure common to the capacitor chips 10a and 10b.

An outer surface of the capacitor chip 10a includes a plurality of surfaces (six in the present embodiment). Among these surfaces, two surfaces opposite each other along the X-axis are an end surface 13 and an end surface 14 (FIG. 3), and the remaining four surfaces are side surfaces 15.

As shown in FIG. 3, the capacitor chip 10a includes internal electrode layers 16 and dielectric layers 17. The internal electrode layers 16 and the dielectric layers 17 are laminated along the Y-axis direction. On the end surfaces 13 and 14, terminal electrodes 11 and 12 are formed respectively. The internal electrode layers 16 are connected to the terminal electrode 11 or 12. The terminal electrode 11 partly wraps around the side surfaces 15, and the terminal electrode 12 partly wraps around the side surfaces 15.

The capacitor chip 10a may have any shape and any size. For example, the capacitor chip 10a has an X-axis dimension of 1.0 to 6.5 mm, a Y-axis dimension of 0.3 to 5.5 mm, and a Z-axis dimension of 0.3 to 5.5 mm.

Figure 4:
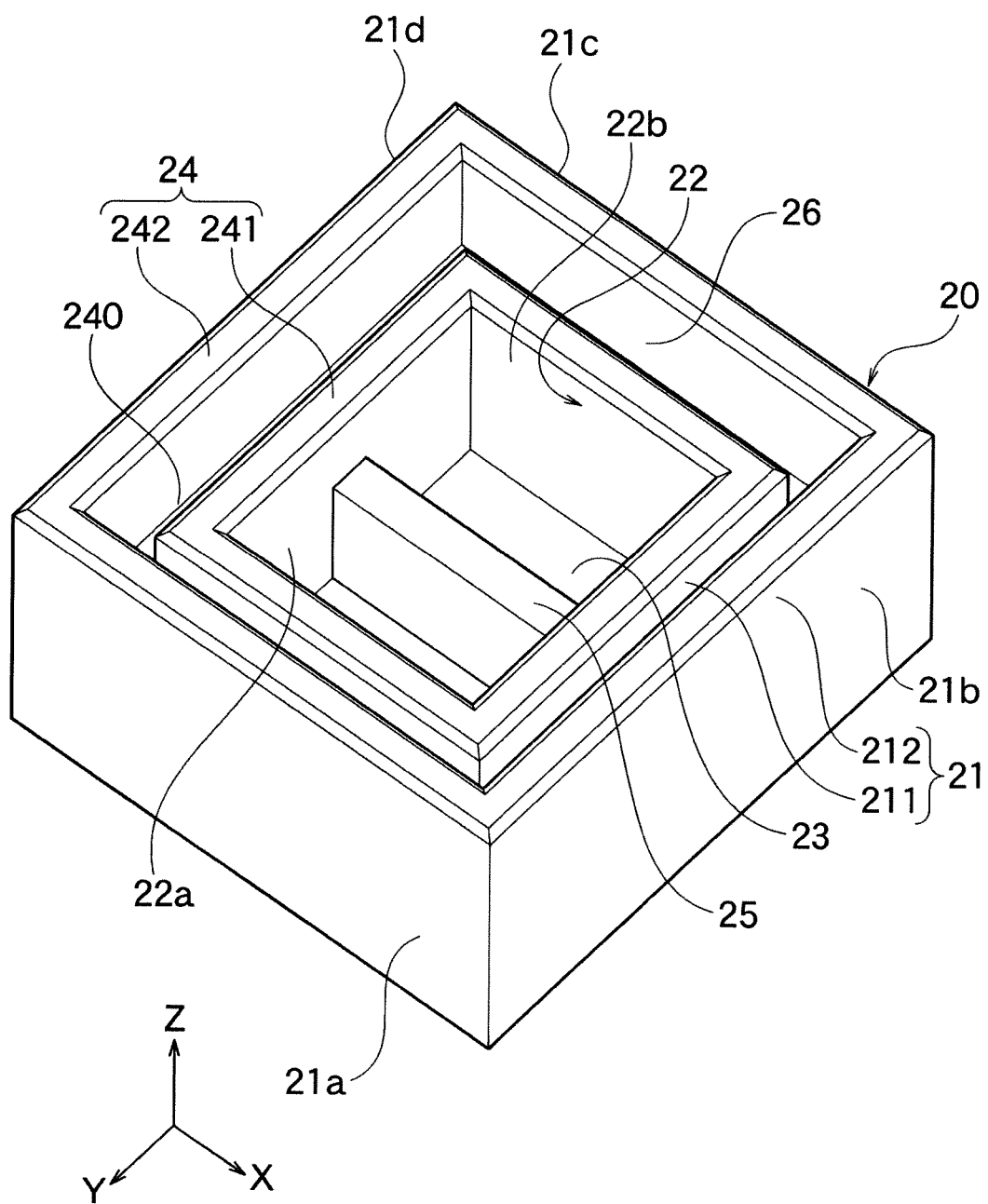
FIG. 4 is a perspective view of a case shown in FIG. 1.

As shown in FIG. 4, the case 20 includes an accommodation recess 22 for accommodating the capacitor chips 10a and 10b, and an opening-edge surface 24 at an opening edge (brim) of the accommodation recess 22. The case 20 may include a wall 21, a bottom surface 23, and a partition portion 25. The case 20 is made of an insulator, such as ceramics, glass, and synthetic resin.

The bottom surface 23 constitutes the bottom of the case 20. At least one of the side surfaces 15 of the capacitor chip 10a is disposed on the bottom surface 23 so as to face the bottom surface 23. At least one of the side surfaces 15 of the capacitor chip 10b is disposed on the bottom surface 23 so as to face the bottom surface 23.

The wall 21 has a tubular shape and is formed along a periphery of the bottom surface 23. The accommodation recess 22 is surrounded by the wall 21. The wall 21 stands perpendicularly to the bottom surface 23 from the periphery of the bottom surface 23. In the present embodiment, the term perpendicular and its derivatives allow for a margin of error of within ±10 degrees, and the term parallel and its derivatives allow for a margin of error of within ±10 degrees.

The wall 21 includes a first side wall portion 21a, a second side wall portion 21b, a third side wall portion 21c, and a fourth side wall portion 21d. The first side wall portion 21a of the wall 21 is a portion located on the positive side of the Y-axis. The second side wall portion 21b of the wall 21 is a portion located on the positive side of the X-axis. The third side wall portion 21c of the wall 21 is a portion located on the negative side of the Y-axis. The fourth side wall portion 21d of the wall 21 is a portion located on the negative side of the X-axis.

The wall 21 includes an inner wall portion 211 and an outer wall portion 212 located outwards from the inner wall portion 211. The first side wall portion 21a, the second side wall portion 21b, the third side wall portion 21c, and the fourth side wall portion 21d each include the inner wall portion 211 and the outer wall portion 212. The inner wall portion 211 and the outer wall portion 212 each have a rectangular tubular shape and protrude upwards. The protrusion length of the outer wall portion 212 is longer than that of the inner wall portion 211.

The difference between the protrusion length of the outer wall portion 212 and the protrusion length of the inner wall portion 211 is equivalent to the thickness of the case cover 60 (FIG. 1). In the present embodiment, the term "equivalent" not only indicates strict equivalence between values to be compared but also allows for a predetermined margin of error between the values. For example, when the values to be compared are different by a margin of within ±10%, the values are deemed equivalent.

The inner wall portion 211 is disposed closer to the accommodation recess 22 than the outer wall portion 212 is. The inner wall portion 211 is surrounded by the outer wall portion 212. A gap (an opening-edge recess 240 described later) is provided between the inner wall portion 211 and the outer wall portion 212, and the inner wall portion 211 and the outer wall portion 212 are discontinuously connected via the gap.

The accommodation recess 22 is a space surrounded by the inner wall portion 211 and is upwardly open. The accommodation recess 22 includes an accommodation space 22a for accommodating the capacitor chip 10a and an accommodation space 22b for accommodating the capacitor chip 10b. The height of the accommodation space 22a may be larger than the length of the capacitor chip 10a along the Z-axis, and the height of the accommodation space 22b may be larger than the length of the capacitor chip 10b along the Z-axis.

Accommodating the capacitor chips 10a and 10b in the accommodation spaces 22a and 22b respectively allows the capacitor chips 10a and 10b to be effectively protected from impact and the like.

The partition portion 25 is provided inside the accommodation recess 22. The partition portion 25 stands perpendicularly to the bottom surface 23 from a center of the bottom surface 23 in the Y-axis direction and extends along the X-axis. The partition portion 25 partitions the accommodation recess 22 into the accommodation space 22a and the accommodation space 22b. The upper end of the partition portion 25 is located at a level lower than the level of the opening of the accommodation recess 22.

The opening-edge surface 24 is an upper end surface of the wall 21. The opening-edge surface 24 has the opening-edge recess 240. The opening-edge surface 24 may include an inner opening-edge surface 241, which is an upper end surface of the inner wall portion 211, and an outer opening-edge surface 242, which is an upper end surface of the outer wall portion 212.

The opening-edge recess 240 is a recess recessed downwards from the opening-edge surface 24. The opening-edge recess 240 extends along the periphery of the accommodation recess 22 so that the accommodation recess 22 is surrounded by the opening-edge recess 240. The opening-edge recess 240 extends along the first side wall portion 21a, the second side wall portion 21b, the third side wall portion 21c, and the fourth side wall portion 21d of the wall 21 but may extend along only one of these side wall portions.

Alternatively, the opening-edge recess 240 may extend along any two of the first side wall portion 21a, the second side wall portion 21b, the third side wall portion 21c, and the fourth side wall portion 21d. For example, the opening-edge recess 240 may extend only along the first side wall portion 21a and the third side wall portion 21c, or only along the second side wall portion 21b and the fourth side wall portion 21d. Moreover, the opening-edge recess 240 may extend along any three of the first side wall portion 21a, the second side wall portion 21b, the third side wall portion 21c, and the fourth side wall portion 21d.

The opening-edge recess 240 is provided at a center of the wall 21 in its thickness direction. That is, the opening-edge recess 240 is provided at respective centers of the first side wall portion 21a and the third side wall portion 21c in the Y-axis direction and at respective centers of the second side wall portion 21b and the fourth side wall portion 21d in the X-axis direction.

The inner wall portion 211 stands at a location inwards from the opening-edge recess 240. The outer wall portion 212 stands at a location outwards from the opening-edge recess 240.

The inner opening-edge surface 241 is disposed closer to the accommodation recess 22 than the outer opening-edge surface 242 is. The inner opening-edge surface 241 has a rectangular ring shape along the opening edge (brim) of the accommodation recess 22. The inner opening-edge surface 241 is closer to the bottom of the case 20 than the outer opening-edge surface 242 is. The difference between the level of the inner opening-edge surface 241 in the Z-axis direction and the level of the outer opening-edge surface 242 in the Z-axis direction is equivalent to the thickness (FIG. 1) of the case cover 60.

The outer opening-edge surface 242 is located outwards from the inner opening-edge surface 241, with the opening-edge recess 240 therebetween. The outer opening-edge surface 242 has a rectangular ring shape along the inner opening-edge surface 241. The inner opening-edge surface 241 and the outer opening-edge surface 242 are discontinuously connected via the opening-edge recess 240.

As shown in FIG. 2, the individual conductive terminals 40a and 40b are attached to the case 20. The individual conductive terminal 40a is electrically connected to the terminal electrode 11 of the capacitor chip 10a, and the individual conductive terminal 40b is electrically connected to the terminal electrode 11 of the capacitor chip 10b.

Figure 5:
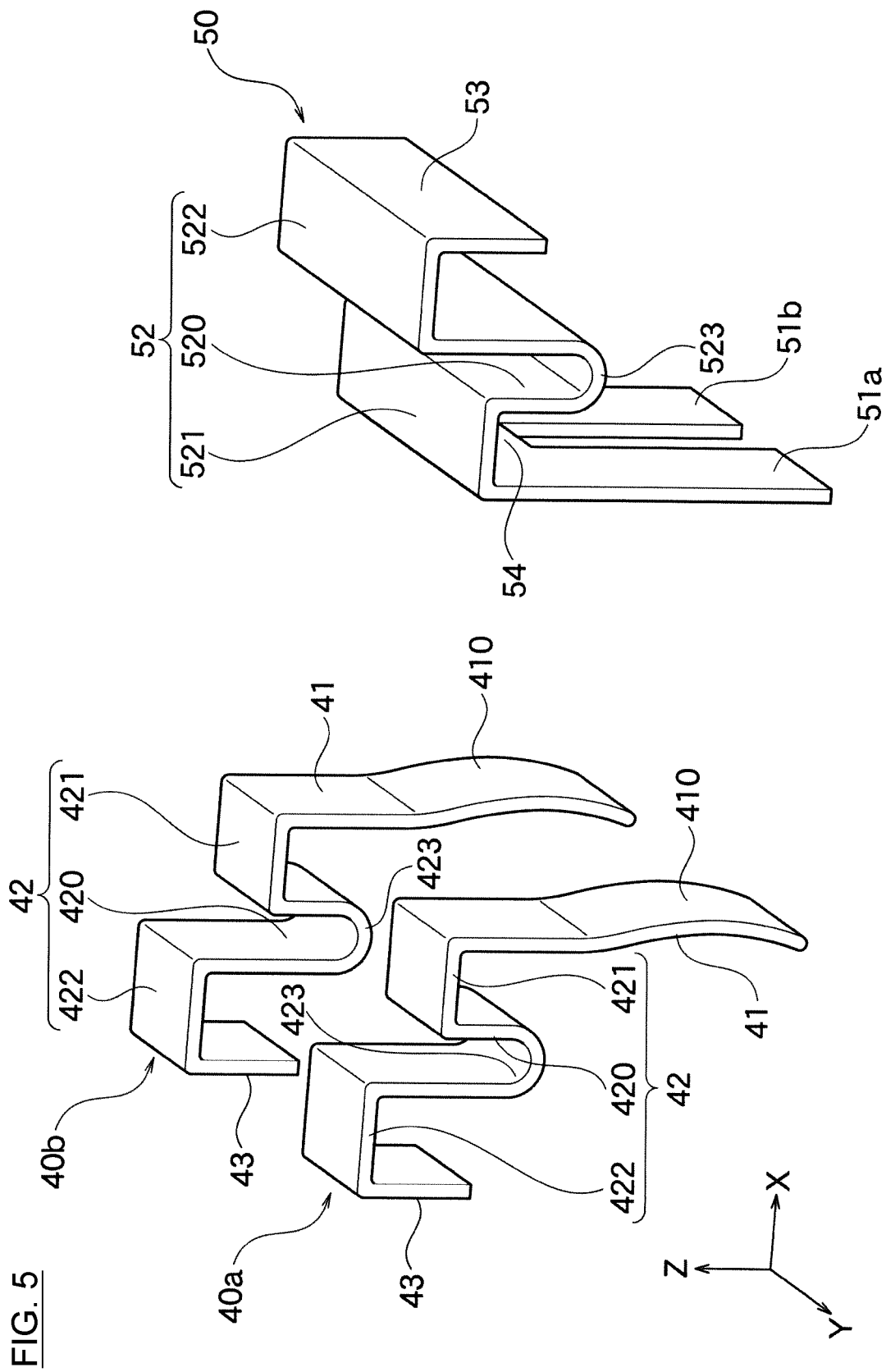
FIG. 5 is a perspective view of conductive terminals shown in FIG. 1.

The individual conductive terminals 40a and 40b have the same shape as shown in FIG. 5 but may have different shapes. Hereinafter, in order to avoid duplication of description, only the individual conductive terminal 40*a* is described with respect to a structure common to the individual conductive terminals 40*a* and 40*b*.

The individual conductive terminal 40*a* is made of a conductive material, such as metal. Examples of the metal constituting the individual conductive terminal 40*a* include iron, nickel, copper, silver, and alloys containing at least one of these elements. On a surface of the individual conductive terminal 40*a*, a metal film made of, for example, Ni, Sn, or Cu, may be formed by plating.

The thickness of the individual conductive terminal 40*a* along the Y-axis is substantially the same as the thickness of the capacitor chip 10*a* (FIG. 1) along the Y-axis, but they may be different. The plate thickness of the individual conductive terminal 40*a* is, for example, 0.01 to 2.0 mm.

The individual conductive terminal 40*a* includes an opening-edge electrode portion 42. The individual conductive terminal 40*a* may include an inner electrode portion 41 and a side electrode portion 43. As shown in FIG. 2, the side electrode portion 43 faces an outer surface of the outer wall portion 212. The side electrode portion 43 is disposed apart from the outer surface of the outer wall portion 212 along the X-axis but may be in contact with the outer surface.

The inner electrode portion 41 is disposed inside the accommodation recess 22 and is physically and electrically connected to the terminal electrode 11 of the capacitor chip 10*a*. The inner electrode portion 41 may have a curved portion 410 (FIG. 5). The curved portion 410 is curved (bent) in a substantially C chape or a substantially semicircular shape so as to protrude towards the terminal electrode 11. The curved portion 410 has elasticity, which allows the inner electrode portion 41 to be anchored to the terminal electrode 11 without use of, for example, solder or conductive adhesive.

The opening-edge electrode portion 42 is located between the inner electrode portion 41 and the side electrode portion 43 and continues to them. The opening-edge electrode portion 42 is disposed over the opening-edge surface 24. As shown in FIG. 5, the opening-edge electrode portion 42 includes a bent portion 420. The opening-edge electrode portion 42 may include an inner anchoring portion 421 and an outer exposed portion 422.

As shown in FIG. 2, the inner anchoring portion 421 is disposed over the inner opening-edge surface 241. The inner anchoring portion 421 continues to the inner electrode portion 41 and extends in a direction orthogonal to the inner electrode portion 41. The inner anchoring portion 421 is in contact with the inner opening-edge surface 241 but may be spaced therefrom.

The outer exposed portion 422 is disposed over the outer opening-edge surface 242. The outer exposed portion 422 continues to the side electrode portion 43 and extends in a direction orthogonal to the side electrode portion 43. The outer exposed portion 422 is in contact with the outer opening-edge surface 242 but may be spaced therefrom.

Figure 7:
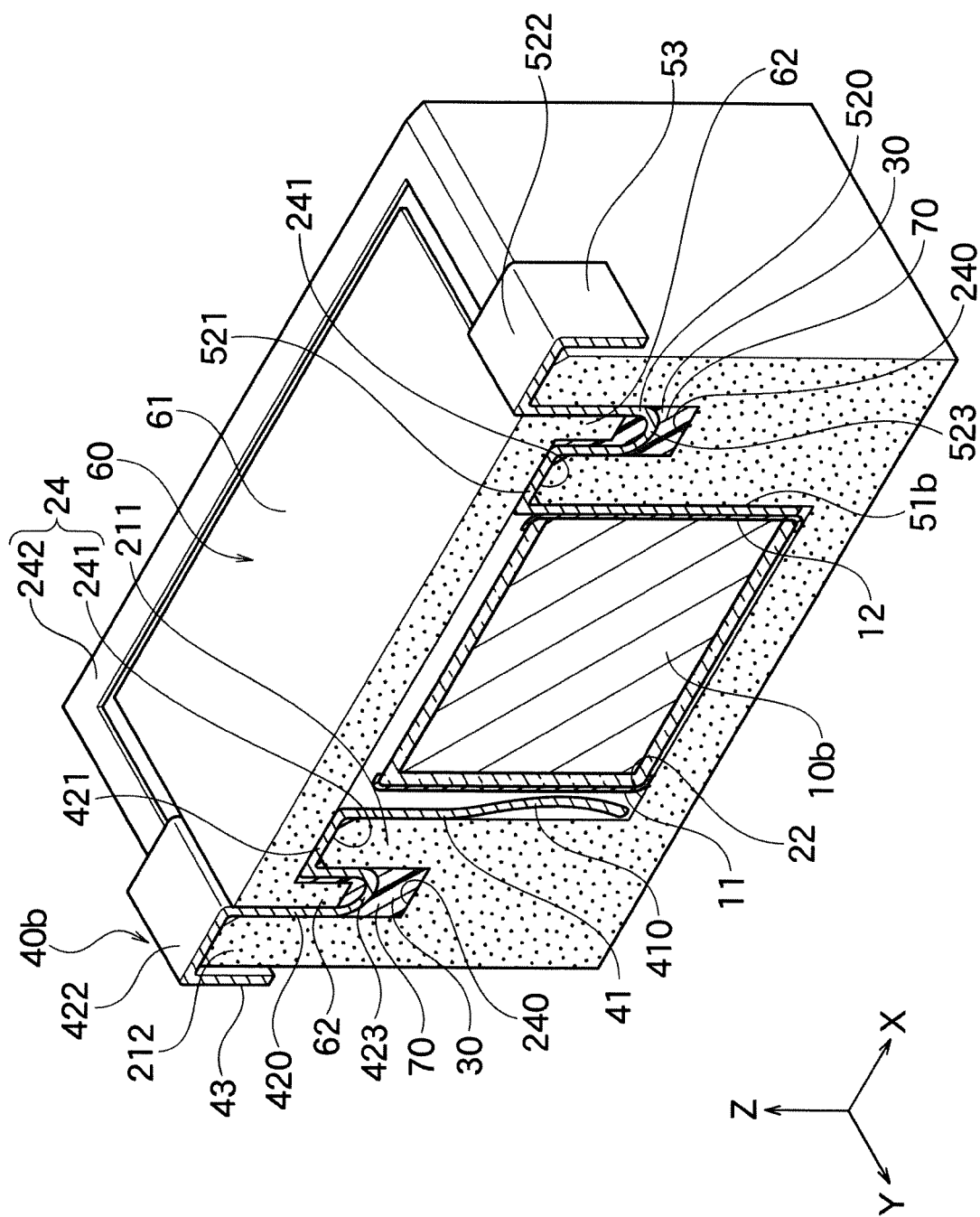
FIG. 7 is a sectional view of the electronic device shown in FIG. 1 along line VII-VII.

As shown in FIG. 7, the inner anchoring portion 421 is disposed between the inner opening-edge surface 241 and the case cover 60 and is interposed therebetween. In contrast, the outer exposed portion 422 is exposed to a space outside the case 20.

The bent portion 420 is located between the inner anchoring portion 421 and the outer exposed portion 422 and continues to them. The bent portion 420 has a substantially U shape, and is bent and extends towards a bottom of the opening-edge recess 240.

The bent portion 420 includes a direction-changing portion 423 where the bent portion 420 is bent from the bottom of the opening-edge recess 240 to make a U-turn. Above the direction-changing portion 423, a leg portion 62 of the case cover 60 (described later) is disposed. The direction-changing portion 423 is not in contact with the bottom of the opening-edge recess 240 and is disposed at a location upwardly away from the bottom of the opening-edge recess 240. The direction-changing portion 423 is disposed between the bottom of the opening-edge recess 240 and the leg portion 62.

The bent portion 420 is in contact with an inner wall of the opening-edge recess 240 but may be spaced therefrom. A part (side part) of the bent portion 420 extends along an outer surface of the inner wall portion 211 (FIG. 4) and is interposed between the leg portion 62 and the outer surface of the inner wall portion 211. Another part (side part) of the bent portion 420 extends along an inner surface of the outer wall portion 212 (FIG. 4) and is interposed between the leg portion 62 and the inner surface of the outer wall portion 212.

As shown in FIG. 2, the common conductive terminal 50 is attached to the case 20. The common conductive terminal 50 is electrically connected to the terminal electrode 12 of the capacitor chip 10*a* and the terminal electrode 12 of the capacitor chip 10*b*. The common conductive terminal 50 is made of the same material as the individual conductive terminal 40*a*.

As shown in FIG. 5, the common conductive terminal 50 includes an opening-edge electrode portion 52. The common conductive terminal 50 may include inner electrode portions 51*a* and 51*b*, a side electrode portion 53, and a connection portion 54. As shown in FIGS. 5 and 2, the side electrode portion 53 faces an outer surface of the outer wall portion 212. The side electrode portion 53 is disposed apart from the outer surface of the outer wall portion 212 along the X-axis but may be in contact with the outer surface.

The inner electrode portion 51*a* is disposed inside the accommodation recess 22 and is physically and electrically connected to the terminal electrode 12 of the capacitor chip 10*a*. The inner electrode portion 51*b* is disposed inside the accommodation recess 22 and is electrically connected to the terminal electrode 12 of the capacitor chip 10*b*.

The inner electrode portions 51*a* and 51*b* have the same shape but may have different shapes. The inner electrode portions 51*a* and 51*b* extend along the Z-axis and are disposed along an inner wall of the accommodation recess 22. Similarly to the individual conductive terminals 40*a* and 40*b*, the inner electrode portions 51*a* and 51*b* may have a curved portion.

The connection portion 54 continues to the inner electrode portions 51*a* and 51*b* and extends in a direction parallel to the inner electrode portions 51*a* and 51*b*. The connection portion 54 serves as a connection between the inner electrode portions 51*a* and 51*b* along the Y-axis.

The opening-edge electrode portion 52 is located between the side electrode portion 53 and the connection portion 54 and continues to them. The opening-edge electrode portion 52 is disposed over the opening-edge surface 24. As shown in FIG. 5, the opening-edge electrode portion 52 includes a bent portion 520. The opening-edge electrode portion 52 may include an inner anchoring portion 521 and an outer exposed portion 522.

As shown in FIG. 2, the inner anchoring portion 521 is disposed over the inner opening-edge surface 241. The inner anchoring portion 521 continues to the connection portion 54 and extends in a direction orthogonal to the connection portion 54. The inner anchoring portion 521 is in contact with the inner opening-edge surface 241 but may be spaced therefrom.

The outer exposed portion 522 is disposed over the outer opening-edge surface 242. The outer exposed portion 522 continues to the side electrode portion 53 and extends in a direction orthogonal to the side electrode portion 53. The outer exposed portion 522 is in contact with the outer opening-edge surface 242 but may be spaced therefrom.

As shown in FIG. 7, the inner anchoring portion 521 is disposed between the inner opening-edge surface 241 and the case cover 60 and is interposed therebetween. In contrast, the outer exposed portion 522 is exposed to the space outside the case 20.

The bent portion 520 is located between the inner anchoring portion 521 and the outer exposed portion 522 and continues to them. The bent portion 520 has a substantially U shape, and is bent and extends towards the bottom of the opening-edge recess 240. The bent portion 520 has the same shape as the bent portion 420 but may have a different shape.

The bent portion 520 includes a direction-changing portion 523 where the bent portion 520 is bent from the bottom of the opening-edge recess 240 to make a U-turn. Above the direction-changing portion 523, another leg portion 62 of the case cover 60 (described later) is disposed. The direction-changing portion 523 is not in contact with the bottom of the opening-edge recess 240 and is disposed at a location upwardly away from the bottom of the opening-edge recess 240.

The bent portion 520 is in contact with an inner wall of the opening-edge recess 240 but may be spaced therefrom. A part (side part) of the bent portion 520 extends along an outer surface of the inner wall portion 211 (FIG. 4) and is interposed between the leg portion 62 and the outer surface of the inner wall portion 211. Another part (side part) of the bent portion 520 extends along an inner surface of the outer wall portion 212 (FIG. 4) and is interposed between the leg portion 62 and the inner surface of the outer wall portion 212.

Figure 6:
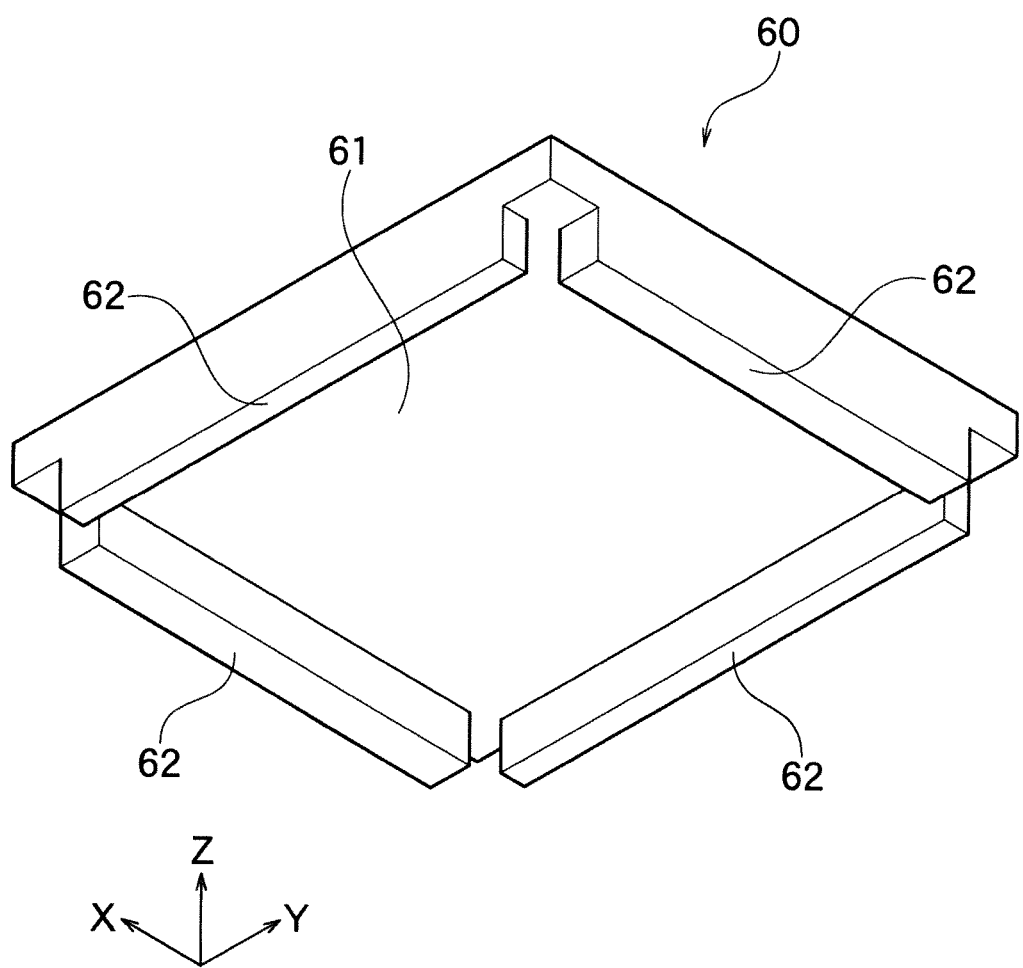
FIG. 6 is a perspective view of a case cover shown in FIG. 1.

As shown in FIG. 6, the case cover 60 includes a cover body 61 and the leg portions 62. The case cover 60 is made of, for example, a resin. The case cover 60 may be made of a resin having higher thermal conductivity than the case 20. Examples of the resin constituting the case cover 60 include liquid crystal polymer (LCP) plastic and polyphenylene sulfide (PPS).

As shown in FIG. 7, the cover body 61 is disposed on the opening-edge surface 24 of the case 20 so as to cover the accommodation recess 22. The cover body 61 is disposed on the inner opening-edge surface 241, and the accommodation recess 22 is fully enclosed by the inner wall portion 211 and the cover body 61.

The case body 61 is accommodated in a case cover accommodation portion 26 (FIG. 4) surrounded by the outer wall portion 212. The case cover accommodation portion 26 is a space located inwards from the outer wall portion 212 and above the inner opening-edge surface 241. An upper surface of the cover body 61 is flush with the outer opening-edge surface 242. Outwards from the inner opening-edge surface 241 in the X-axis direction and/or the Y-axis direction, a periphery of the case body 61 covers the opening-edge recess 240. In the present embodiment, the term "flush with" not only indicates being at exactly the same level but also allows for a margin of error of within ±10%.

The leg portions 62 are formed at the periphery of the case body 61 and protrude in a direction perpendicular to the cover body 61. The protrusion length of the leg portions 62 is smaller than the depth of the opening-edge recess 240 along the Z-axis (height from the bottom of the opening-edge recess 240 to the inner opening-edge surface 241). Although the cover body 61 has four leg portions 62 as shown in FIG. 6, the number of the leg portions 62 is not limited to four. Although no leg portion 62 is disposed at four corners of the cover body 61, part of the leg portions 62 may be disposed at these corners.

As shown in FIG. 7, the leg portions 62 protrude towards the bottom of the case 20 and are fitted into the opening-edge recess 240. Between the opening-edge recess 240 and the case cover 60 is a space 70. More specifically, the space 70 is provided between tips of the leg portions 62 and the bottom of the opening-edge recess 240. Inside the space 70, part (e.g., the direction-changing portion 423) of the bent portion 420 of each of the individual conductive terminals 40a and 40b is disposed. The height of the space 70 along the Z-axis is larger than, for example, ½ of the depth of the opening-edge recess 240 along the Z-axis (height from the bottom of the opening-edge recess 240 to the inner opening-edge surface 241).

The space 70 is filled with the resin 30. The resin 30 is an insulating resin and is, for example, a thermosetting resin (e.g., an epoxy based resin and a phenol based resin). The space 70 may be completely filled with the resin 30 with no gaps. Inside the space 70, at least part (e.g., the direction-changing portion 423) of the bent portion 420 is covered with the resin 30. Likewise, inside the space 70, at least part (e.g., the direction-changing portion 523) of the bent portion 520 is covered with the resin 30.

The resin 30 adheres to the leg portions 62, and the leg portions 62 are connected to the opening-edge recess 240 via the resin 30. The resin 30 may be present between the leg portions 62 and the outer surfaces of the inner wall portion 211. The resin 30 may also be present between the leg portions 62 and the inner surfaces of the outer wall portion 212.

Filling the space 70 with the resin 30 cuts off the space 70 from an external atmosphere outside the case 20 and from an internal atmosphere of the accommodation recess 22. As a result, the accommodation recess 22 located inwards from the opening-edge recess 240 in the X-axis direction and/or the Y-axis direction is also cut off from the external atmosphere outside the case 20.

The electronic device 1 can be manufactured as follows. First, the case 20 shown in FIG. 4 is prepared, and the individual conductive terminals 40a and 40b and the common conductive terminal 50 are attached to the case 20 as shown in FIG. 2. Then, the capacitor chip 10a is accommodated in the accommodation space 22a (FIG. 4), and the capacitor chip 10b is accommodated in the accommodation space 22b (FIG. 4). Then, as shown in FIG. 7, the opening-edge recess 240 is filled with the resin 30. Then, the leg portions 62 of the case cover 60 shown in FIG. 6 are fitted into the opening-edge recess 240 to accommodate the case cover 60 in the case cover accommodation portion 26 (FIG. 4). At this time, it is preferable that the amount of the resin 30 with which the opening-edge recess 240 is filled be adjusted so that the space 70 (FIG. 7) is completely (without gaps) filled with the resin 30. However, the space 70 may have gaps where the resin 30 is not present inside. It is also preferable that the amount of the resin 30 with which the opening-edge recess 240 is filled be adjusted so that the resin 30 does not overflow into the accommodation space 22a or the accommodation space 22b. The electronic device 1 can be manufactured in the above-mentioned manner.

Any other method may be used to manufacture the electronic device 1. For example, the timing of filling the opening-edge recess 240 with the resin 30 may be appropriately changed. Specifically, the opening-edge recess 240 may be filled with the resin 30 before the individual conductive terminals 40a and 40b and the common conductive terminal 50 are attached to the case 20. Alternatively, the opening-edge recess 240 may be filled with the resin 30 after the individual conductive terminals 40a and 40b and the common conductive terminal 50 are attached to the case 20 and before the capacitor chips 10a and 10b are accommodated in the accommodation spaces 22a and 22b.

As shown in FIG. 7, in the electronic device 1 of the present embodiment, the space 70 between the opening-edge recess 240 and the case cover 60 is filled with the resin 30. Thus, the case cover 60 is connected to the opening-edge recess 240 via the resin 30 in the space 70. The accommodation recess 22 is sealed (airtightly shut) with the case cover 60 and the resin 30, thereby having improved moisture resistance inside. Thus, the moisture resistance of the inside of the accommodation recess 22 can be improved without the accommodation recess 22 accommodating the capacitor chips 10a and 10b being sealed with the resin. Also, flame retardancy, vibration resistance, impact resistance, dust resistance, heat dissipation, etc. of the electronic device 1 can be improved.

Also, because a need for the accommodation recess 22 to be filled with the resin 30 is eliminated, misalignment of a contact point between the individual conductive terminal 40a or 40b and the corresponding terminal electrode 11 attributable to expansion of the resin 30 can be prevented, which allows for avoidance of contact failure (open-circuit faults) between them. Likewise, contact failure (open-circuit faults) between the common conductive terminal 50 and the terminal electrodes 12 can be prevented. It is preferable that the accommodation recess 22 not be filled with the resin 30, but the resin 30 may slightly enter the accommodation recess 22.

As shown in FIG. 3, the opening-edge recess 240 extends along the periphery of the accommodation recess 22 so as to surround it. Thus, the case cover 60 (FIG. 6) is connected to the opening-edge recess 240 via the resin 30 along the periphery of the accommodation recess 22 so as to surround it. Hermeticity of the accommodation recess 22 is thereby improved, which can further improve the moisture resistance of the inside of the accommodation recess 22.

As shown in FIG. 7, the cover body 61 has a shape and a size that enable the cover body 61 to be disposed on the inner opening-edge surface 241. Thus, the case cover 60 and, by extension, the electronic device 1 can be reduced in size.

The distance between the inner opening-edge surface 241 and the bottom of the case 20 is shorter than the distance between the outer opening-edge surface 242 and the bottom of the case 20. Thus, protrusion of the cover body 61 from the level of the opening of the case 20 can be prevented when the cover body 61 is disposed on the inner opening-edge surface 241.

The inner anchoring portion 421 is disposed between the inner opening-edge surface 241 and the cover body 61. Thus, the inner anchoring portion 421 is interposed between the inner opening-edge surface 241 and the cover body 61 and can be anchored to the inner opening-edge surface 241. The outer exposed portion 422 is disposed over the outer opening-edge surface 242 and is exposed outside. Thus, for example, the individual conductive terminals 40a and 40b can be connected to an external substrate (not shown in the drawings) via the outer exposed portion 422.

The individual conductive terminals 40a and 40b and the common conductive terminal 50 are attached to the case 20. The capacitor chips 10a and 10b are electrically connected via these terminals. The capacitor chips 10 and 10b can thereby be connected in series.

The electronic device 1 can be mounted on an external substrate in, for example, the following manner. For example, connecting the individual conductive terminals 40a and 40b shown in FIG. 2 to the external substrate and leaving the common conductive terminal 50 floating allows for a series capacitor circuit consisting of the capacitor chips 10a and 10b.

Moreover, connecting all of the individual conductive terminals 40a and 40b and the common conductive terminal 50 to the external circuit allows for a parallel capacitor circuit consisting of the capacitor chips 10a and 10b.

A mounting orientation of the electronic device 1 on the external circuit is not limited to particular orientations. For example, the outer exposed portions 422 of the individual conductive terminals 40a and 40b and/or the outer exposed portion 522 of the common conductive terminal 50 may be connected to the external circuit while the opening of the case 20 shown in FIG. 2 faces the external substrate. Alternatively, the side electrode portions 43 of the individual conductive terminals 40a and 40b may be connected to the external circuit while the wall 21 (e.g., the fourth side wall portion 21d of the case 20 shown in FIG. 4) of the case 20 faces the external substrate.

The case cover 60 is accommodated in the case cover accommodation portion 26 (FIG. 4). Thus, the cover body 61 is surrounded by the outer wall portion 212 (FIG. 4). This can prevent misalignment or detachment of the case cover 60.

The leg portions 62 are fitted into the opening-edge recess 240. Thus, the leg portions 62 are anchored to the opening-edge recess 240. This can prevent misalignment or detachment of the case cover 60.

The space 70 is provided between the leg portions 62 and the bottom of the opening-edge recess 240. Thus, the leg portions 62 and the opening-edge recess 240 can be connected via the resin 30 in the space 70. The inside of the accommodation recess 22 can thereby be airtightly sealed with the case cover 60.

The direction-changing portions 423 are disposed between the bottom of the opening-edge recess 240 and the corresponding leg portion 62. Thus, the direction-changing portions 423 and the opening-edge recess 240 can be connected via the resin 30 in the space 70. Because the direction-changing portions 423 are interposed between the bottom of the opening-edge recess 240 and the leg portion 62, the direction changing portions 423 can be anchored to the opening-edge recess 240.

The wall 21 includes the inner wall portion 211 and the outer wall portion 212. Thus, the opening-edge recess 240 can be provided on the opening-edge surface 24 so as to be interposed between the inner wall portion 211 and the outer wall portion 212. The space 70 between the opening-edge recess 240 and the case cover 60 thereby readily holds the resin 30.

Second Embodiment

An electronic device 1A of the present embodiment shown in FIG. 8 has the same structure as the electronic device 1 of First Embodiment except for the matters described below. Members common to First Embodiment are given the same reference numerals, and their detailed description is omitted.

Figure 8:
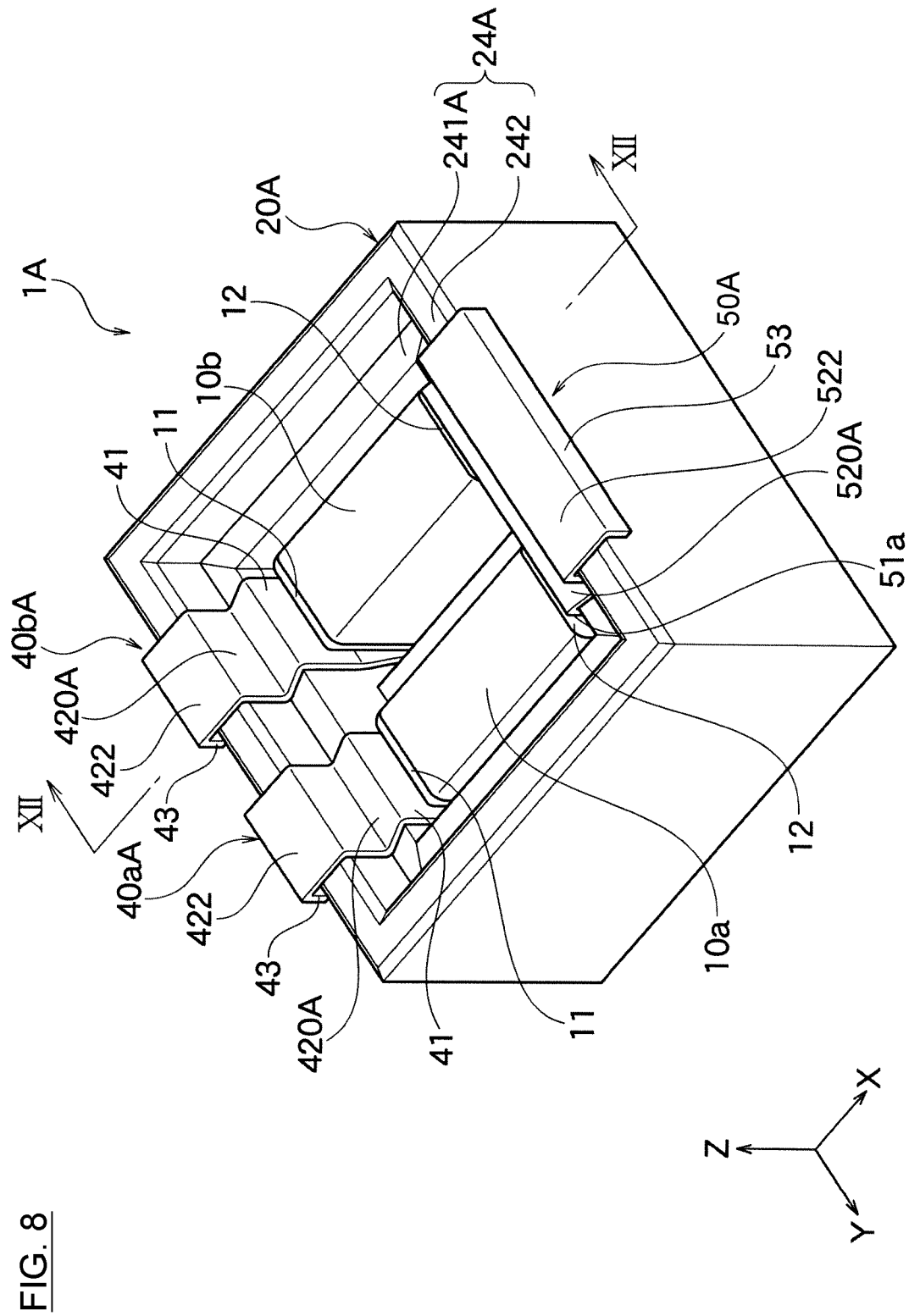
FIG. 8 is a perspective view illustrative of an internal structure of an electronic device of Second Embodiment.
Figure 9:
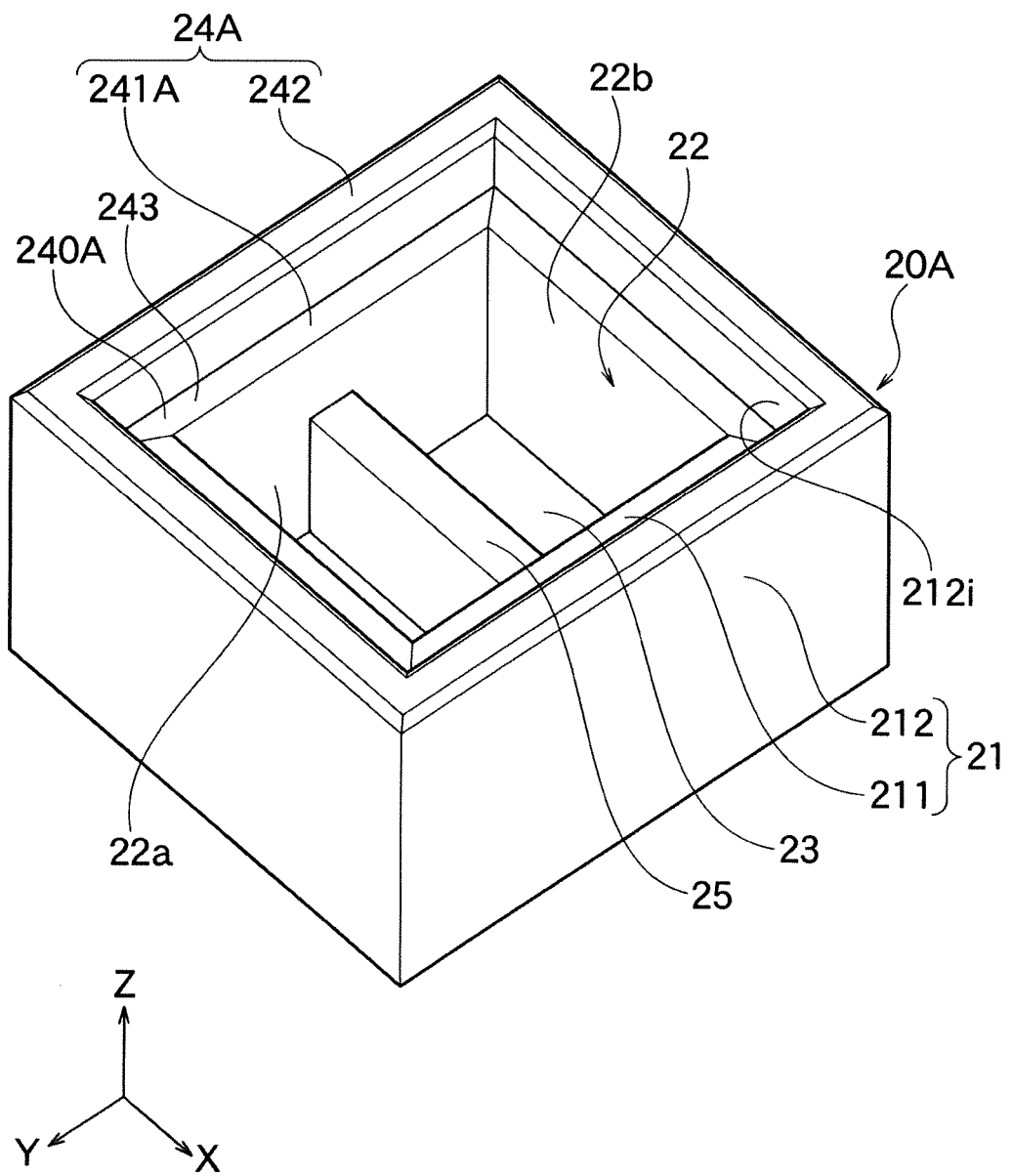
FIG. 9 is a perspective view of a case shown in FIG. 8.
Figure 10:
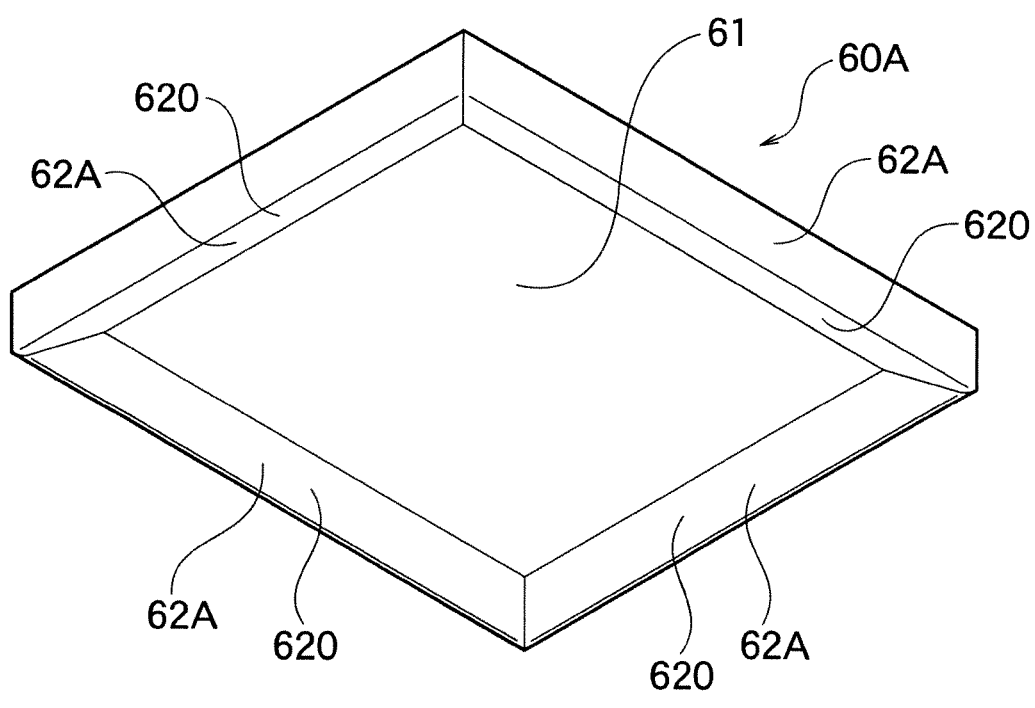
FIG. 10 is a perspective view of a case cover attached to the case shown in FIG. 9.

As shown in FIG. 8, the electronic device 1A includes a case 20A, individual conductive terminals 40aA and 40bA, a common conductive terminal 50A, and a case cover 60A (FIG. 10). As shown in FIG. 9, the case 20A includes an opening-edge surface 24A. The opening-edge surface 24A has an opening-edge recess 240A and includes an inner opening-edge surface 241A.

The inner opening-edge surface 241A has an opening-edge sloping portion 243. The opening-edge sloping portion 243 slopes outwards towards the bottom of the case 20A (towards the negative side of the Z-axis). The inner opening-edge surface 241A may be sloped by, for example, 5 degrees or more with respect to an X-Y plane (or the outer opening-edge surface 242).

In the present embodiment, the opening-edge recess 240A is provided at a location where the inner opening-edge surface 241A and an inner surface 212i of the outer wall portion 212 meet and its nearby location and is defined by the inner opening-edge surface 241A and the inner surface 212i of the outer wall portion 212. The inner opening-edge surface 241A and the outer opening-edge surface 242 are non-parallel and are discontinuously connected via the inner surface 212i of the outer wall portion 212.

Figure 12:
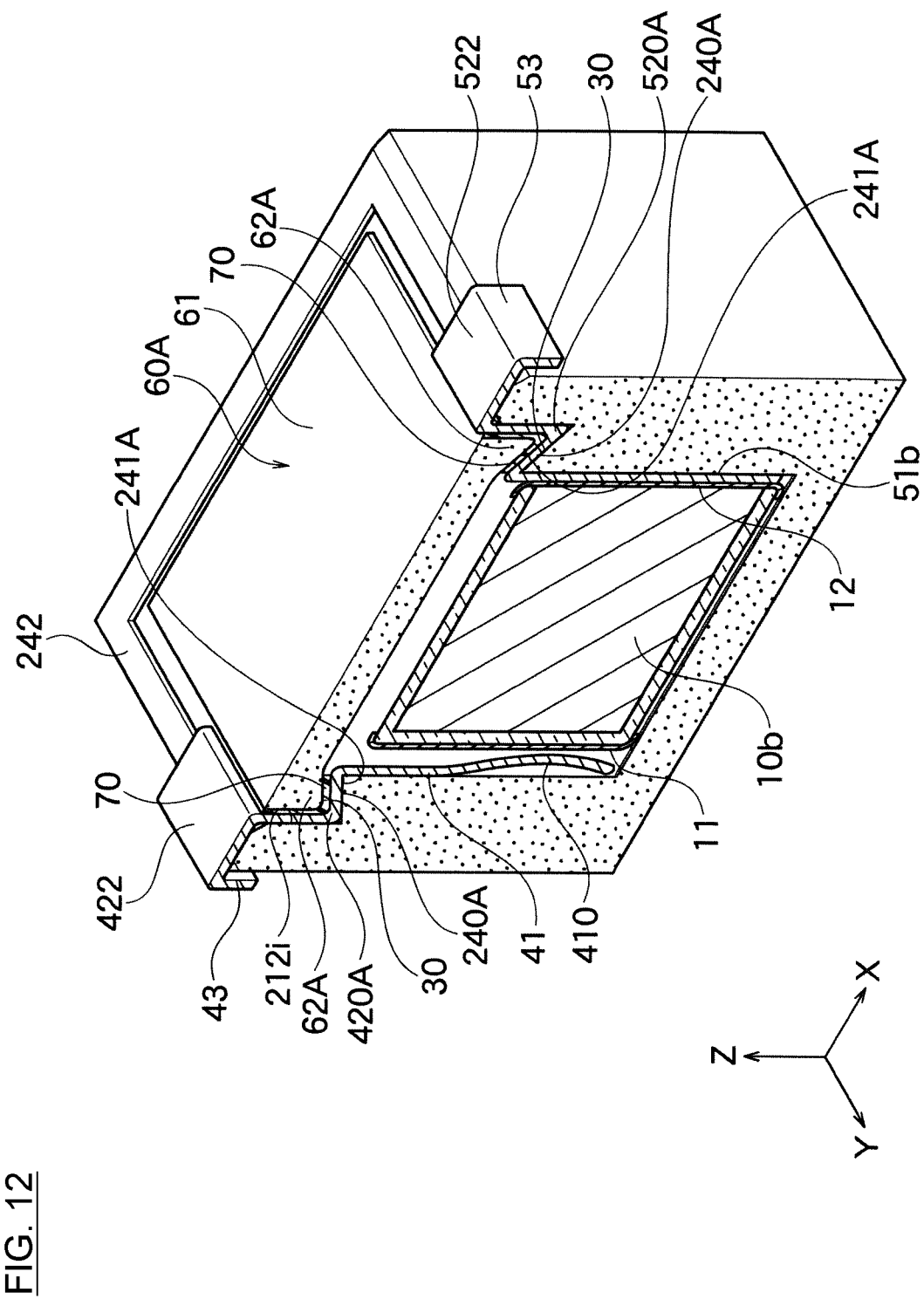
FIG. 12 is a sectional view of the electronic device shown in FIG. 8 along line XII-XII.

As shown in FIG. 10, the case cover 60A includes leg portions 62A. The leg portions 62A are formed in a rectangular ring shape and continuously surround the periphery of the cover body 61. The leg portions 62A may each have a cover sloping portion 620. The cover sloping portion 620 slopes down along the opening-edge sloping portion 243 (FIG. 9) and outwards towards the negative side of the Z-axis. As shown in FIG. 12, the leg portions 62A are disposed over the inner opening-edge surface 241A so as to engage with the opening-edge recess 240A.

Figure 11:
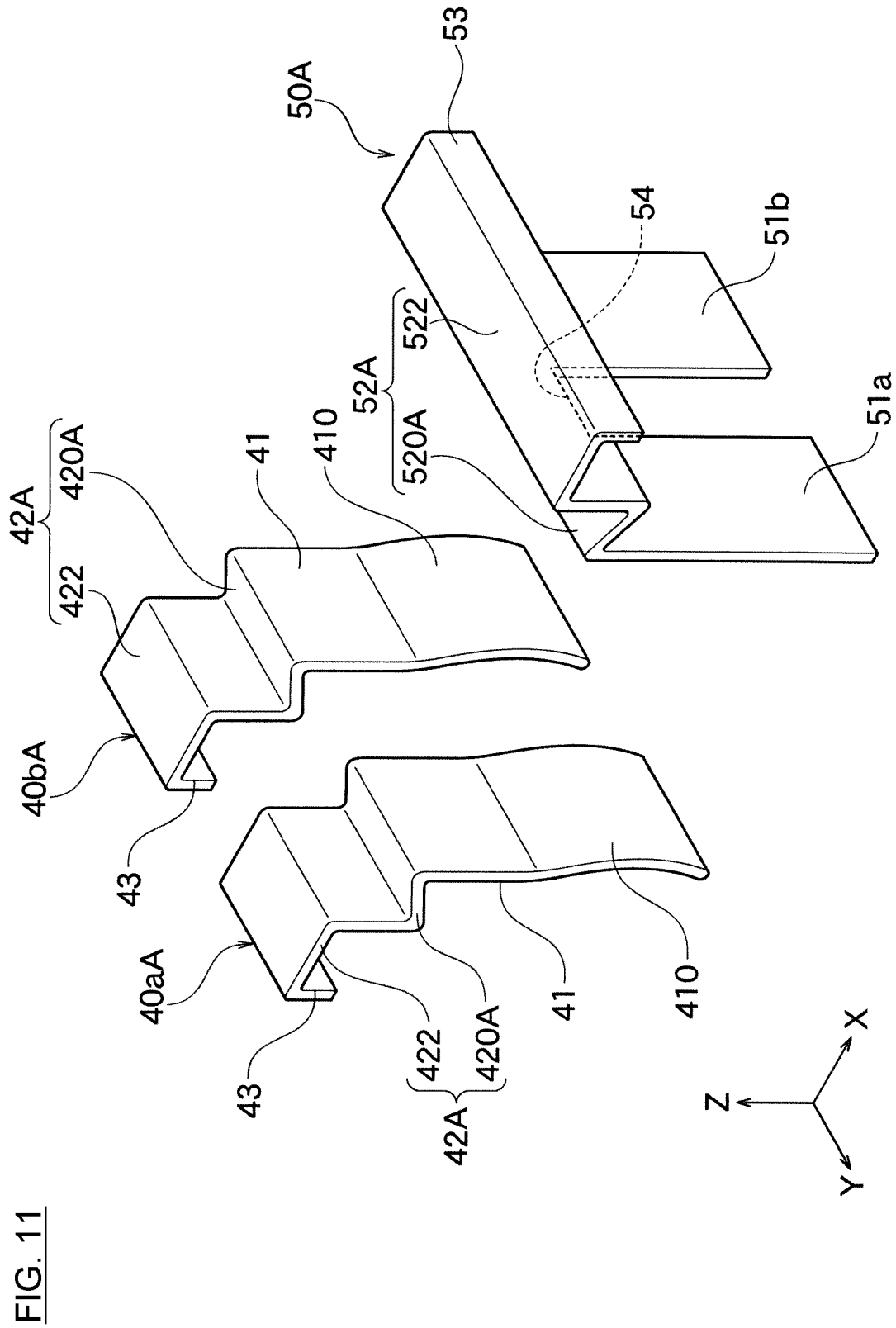
FIG. 11 is a perspective view of conductive terminals shown in FIG. 8.

As shown in FIG. 11, the individual conductive terminals 40aA and 40bA each include an opening-edge electrode portion 42A. The opening-edge electrode portion 42A includes a bent portion 420A. As shown in FIG. 12, the bent portion 420A has a substantially L shape and is bent towards the bottom of the opening-edge recess 240A. The bent portion 420A is disposed along the inner surface 212i of the outer wall portion 212 and the inner opening-edge surface 241A. The bent portion 420A is in contact with the inner surface 212i of the outer wall portion 212 and the inner opening-edge surface 241A but may be spaced therefrom.

The bent portion 420A is disposed so as to be interposed between the opening-edge recess 240A and the corresponding leg portion 62A. Part of the bent portion 420A is interposed between the leg portion 62A and the inner opening-edge surface 241A. Another part of the bent portion 420A is interposed between the leg portion 62A and the inner surface 212i of the outer wall portion 212.

Between the opening-edge recess 240A (the bottom of the opening-edge recess 240A) and the leg portions 62A is the space 70, which is filled with the resin 30. In the example shown in FIG. 12, the resin 30 is present between the corresponding leg portion 62A and the bent portion 420A. Further, the resin 30 may be present below the bent portion 420A. Moreover, the resin 30 may be present between the leg portion 62A and the inner surface 212i of the outer wall portion 212.

The present embodiment also gives the same effects as First Embodiment does. That is, in the present embodiment, the leg portions 62A are connected to the opening-edge recess 240A via the resin 30 in the space 70. The accommodation recess 22 is sealed (airtightly shut) with the case cover 60A and the resin 30, thereby being capable of having improved moisture resistance inside.

Additionally, in the present embodiment, the inner opening-edge surface 241A has the opening-edge sloping portion 243 (FIG. 9). Thus, the inner opening-edge surface 241A can have the opening-edge recess 240A recessed along the opening-edge sloping portion 243. The resin 30 can thus be prevented from leaking from the space 70 between the inner opening-edge surface 241A and the case cover 60A.

The cover sloping portion 620 (FIG. 10) is provided on each of the leg portions 62A. Disposing the cover sloping portions 620 over the opening-edge sloping portion 243 allows the opening-edge recess 240A and the leg portions 62A to firmly adhere to each other, which can improve adhesion between the opening-edge recess 240A and the case cover 60A.

The present disclosure is not limited to the above-described embodiments and may variously be modified within the scope of the present disclosure.

In each of the above-described embodiments, the chip components are not limited to capacitor chips and may be chip inductors, chip resistors, or the like.

In each of the above-described embodiments, the electronic device 1 or 1A may be provided with only the individual conductive terminals as conductive terminals or only the common conductive terminal as a conductive terminal. For example, the case 20 shown in FIG. 1 may be provided with four individual conductive terminals or with two common conductive terminals.

In First Embodiment, the case 20 shown in FIG. 4 may be composed of a combination of cases. For example, a case (an inner case) having the accommodation recess 22 and another case (an outer case) accommodating the inner case may be prepared, and the inner case may be accommodated in the outer case, to constitute the case 20 including the opening-edge recess 240 shown in FIG. 4.

In First Embodiment, the leg portions 62 may be omitted from the case cover shown in FIG. 6. In this case, the space 70 can be provided between the cover body 61 and the opening-edge recess 240 (FIG. 7). The same applies to Second Embodiment.

REFERENCE NUMERALS 1, 1A . . . electronic device
10a, 10b . . . capacitor chip
11, 12 . . . terminal electrode
13, 14 . . . end surface
15 . . . side surface
16 . . . internal electrode layer
17 . . . dielectric layer
20, 20A . . . case
21 . . . wall
211 . . . inner wall portion
212 . . . outer wall portion
212i . . . inner surface
22 . . . accommodation recess
22a, 22b . . . accommodation space
23 . . . bottom surface
24, 24A . . . opening-edge surface
240, 240A . . . opening-edge recess
241, 241A . . . inner opening-edge surface
242 . . . outer opening-edge surface
243 . . . opening-edge sloping portion
25 . . . partition portion
26 . . . case cover accommodation portion 30 ... resin
40a, 40b, 40aA, 40bA ... individual conductive terminal
41 ... inner electrode portion
410 ... curved portion
42, 42A ... opening-edge electrode portion
420, 420A ... bent portion
421 ... inner anchoring portion
422 ... outer exposed portion
423 ... direction-changing portion
43 ... side electrode portion
50, 50A ... common conductive terminal
51a, 51b ... inner electrode portion
52, 52A ... opening-edge electrode portion
520, 520A ... bent portion
521 ... inner anchoring portion
522 ... outer exposed portion
53 ... side electrode portion
54 ... connection portion
60 ... case cover
61 ... cover body
62, 62A ... leg portion
620 ... cover sloping portion
70 ... space

What is claimed is:

1. An electronic device comprising:
a chip component including a terminal electrode;
a case having an accommodation recess accommodating the chip component;
a conductive terminal attached to the case and connected to the terminal electrode; and
a case cover disposed on an opening-edge surface of the case so as to cover the accommodation recess;
wherein
the opening-edge surface has an opening-edge recess at least partly covered by the case cover;
the opening-edge recess and the case cover have a space therebetween; and
the space is filled with a resin.

2. The electronic device according to claim 1, wherein the opening-edge recess extends along a periphery of the accommodation recess so as to surround the accommodation recess.

3. The electronic device according to claim 1, wherein
the opening-edge surface comprises an inner opening-edge surface and an outer opening-edge surface located outwards from the inner opening-edge surface; and
the case cover is disposed on the inner opening-edge surface.

4. The electronic device according to claim 3, wherein a distance between the inner opening-edge surface and a bottom of the case is shorter than a distance between the outer opening-edge surface and the bottom of the case.

5. The electronic device according to claim 3, wherein
the conductive terminal comprises an opening-edge electrode portion disposed over the opening-edge surface; and
the opening-edge electrode portion comprises an inner anchoring portion disposed between the inner opening-edge surface and the case cover, and an outer exposed portion disposed over the outer opening-edge surface and exposed outside.

6. The electronic device according to claim 1, wherein
the case comprises a wall surrounding the accommodation recess;
the wall comprises an outer wall portion located outwards from the opening-edge recess; and
the case cover is accommodated in a case cover accommodation portion surrounded by the outer wall portion.

7. The electronic device according to claim 1, wherein
the case cover comprises a leg portion at a periphery of the case cover; and
the leg portion engages with the opening-edge recess.

8. The electronic device according to claim 7, wherein the space is provided between the leg portion and a bottom of the opening-edge recess.

9. The electronic device according to claim 7, wherein
the conductive terminal comprises an opening-edge electrode portion disposed over the opening-edge surface;
the opening-edge electrode portion comprises a bent portion bent towards a bottom of the opening-edge recess; and
the bent portion is disposed between the bottom of the opening-edge recess and the leg portion.

10. The electronic device according to claim 1, wherein
the case comprises a wall surrounding the accommodation recess; and
the wall comprises an outer wall portion located outwards from the opening-edge recess, and an inner wall portion located inwards from the opening-edge recess.

11. The electronic device according to claim 1, wherein
the opening-edge surface comprises an inner opening-edge surface and an outer opening-edge surface located outwards from the inner opening-edge surface; and
the inner opening-edge surface comprises an opening-edge sloping portion sloping down outwards.

12. The electronic device according to claim 11, wherein
the case cover comprises a leg portion at a periphery of the case cover; and
the leg portion comprises a cover sloping portion sloping along the opening-edge sloping portion.

* * * * *